Inventor
John M. Wolfskill

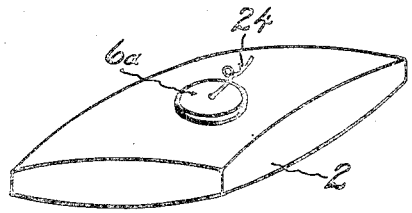
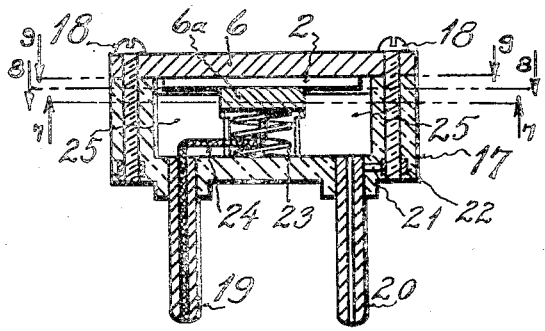
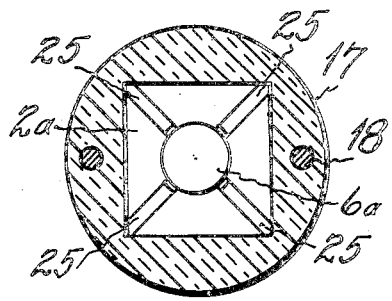
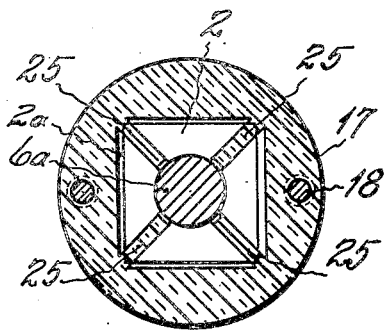
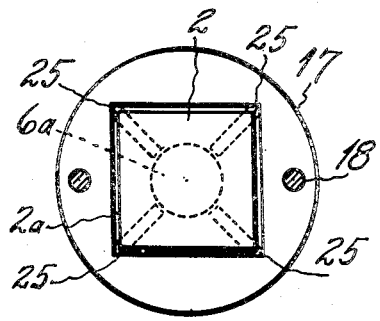
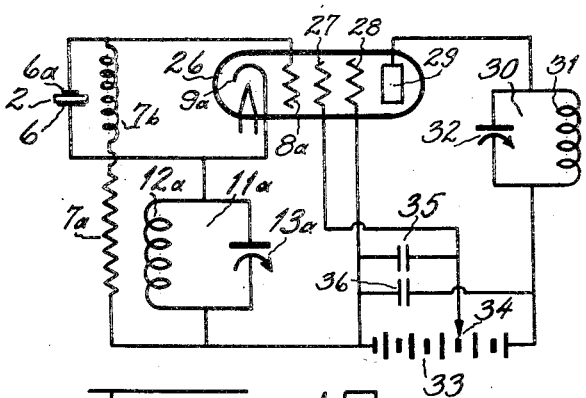

INVENTOR
JOHN M. WOLFSKILL
Ben J. Chromy
ATTORNEY

Patented Apr. 12, 1949

2,467,353

UNITED STATES PATENT OFFICE 2,467,353

PIEZOELECTRIC CRYSTAL APPARATUS

John M. Wolfskill, Erie, Pa.

Application February 16, 1939, Serial No. 256,781

28 Claims. (Cl. 171—327)

This invention relates to piezo-electric crystals and apparatus for employing piezo-electric crystals, generally. More particularly this invention relates to piezo-electric crystals and apparatus for employing piezo-electric crystals adapted for generating ultra-high frequency electric oscillations.

This application is a continuation in part of my application Serial No. 38,134 filed August 27, 1935, issued as Patent No. 2,157,808.

An object of this invention is to provide a piezo-electric crystal adapted for harmonic operation Another object of this invention is to provide a piezo-electric crystal adapted to oscillate efficiently at frequencies which are materialy higher than its fundamental frequency.

A further object of this invention is to provide a piezo-electric crystal adapted to sustain oscillations which bear a harmonic relation to its fundamental frequency.

Still a further object of this invention is to provide a piezo-electric crystal of quartz ground to a thickness such that the fundamental frequency of the crystal is in the neighborhood of 4 megacycles and operating the crystal on a harmonic of the fundamental frequency for stabilizing the frequency of electric oscillations of said harmonic frequency.

Still another object of this invention is to provide a piezoelectric crystal oscillator adapted to stabilize the frequencies of oscillations of ultra-high frequencies.

Still another object of this invention is to provide a piezo-electric crystal cut and ground in such a manner that the crystal can be made to oscillate at frequencies which bear an harmonic relation to the lowest frequency at which the crystal will oscillate.

Still another object of this invention is to provide a crystal oscillation generator adapted to oscillate readily and efficiently at any one of a series of progressively increasing high frequencies.

Another object of this invention is to provide piezo-electric crystal apparatus adapted for stabilization, oscillation and absorption of high and ultra-high frequency electrical oscillations, and employing a piezo-electric crystal with a high, approaching an optical, finish, and with the major faces thereof being slightly convex.

A further object of this invention is to provide piezo-electric crystal apparatus adapted for stabilization, generation and absorption of high and ultra-high frequency electrical oscillations, said piezo-electric crystal apparatus consisting of a crystal element with the major faces thereof slightly convex and with a high finish approaching an optical finish and a holder for said element, said holder having at least one electrode thereof of a small area compared to the area of the corresponding major face of the crystal element to facilitate the use of the crystal apparatus on the high and ultra-high frequency oscillations.

Still a further object of this invention is to provide piezoelectric crystal apparatus adapted for stabilization, generation and absorption of high and ultra-high frequency electrical oscillations, said piezoelectric crystal apparatus consisting of a crystal element with the major faces thereof slightly convex and with a high finish approaching an optical finish thereon, said major faces being cut substantially parallel to the X-axis of the mother crystal and at an angle between +20 and +40 degrees to the optic axis.

A further object of this invention is to provide piezoelectric crystal apparatus adapted for use with high and ultra-high frequency electrical oscillations and employing a piezoelectric crystal adapted to oscillate in the thickness mode, said crystal having at least one of its major faces of approximately one square inch area and slightly convex, the thickness of said crystal adjacent to the edges thereof being approximately 75 millionths of an inch less than the thickness in the central portions of said crystal.

A further object of this invention is to provide a piezoelectric crystal adapted to oscillate in the thickness mode, said crystal having at least one of its major faces slightly convex and being characterised by the absence of slight depressions in the contour of its major faces.

Another object of this invention is to provide a method for facilitating harmonic operation of piezoelectric crystal apparatus including the steps of placing an electrode which is relatively small compared to a major face of the crystal, over said major face of the piezoelectric crystal and moving said electrode over the surface of said major face until said electrode is over a portion of said face surface that has an even contour free from depressions detrimental to high frequency harmonic operation.

Other and further objects and features of this invention will be apparent to those skilled in the art to which it relates from the following specification and the claims.

In accordance with this invention I provide piezoelectric crystal apparatus adapted for use on high and ultra-high frequencies in a more economical, satisfactory and practical manner than has heretofore been possible. My invention has a number of distinct advantages and features and these will be more fully set forth in the following specification. The principal feature of this invention is that it facilitates and greatly simplifies the production and use of piezoelectric crystals on high and ultra-high frequencies. This has been accomplished by cutting and grinding and lapping the piezoelectric crystals so that the major faces, that is the electrode faces, are practically parallel and the central portions of said faces are free from even minute depressions. The peripheral portions of the crystal element are ground down slightly to make at least one of the major faces slightly convex. I have found that grinding down the thickness of the crystal around the edges should be very slight and that this peripheral thickness should be not more than 0.000075 of an inch less than the thickness in the center in the case of a crystal that is approximately 0.7 inch wide, 0.9 inch long and has a third harmonic of around 15 megacycles. Crystals found to be the best harmonic oscillators were cut from the mother crystal with the major faces of the crystal substantially parallel to the X-axis and at various angles between plus 20 degrees and plus 40 degrees to the optic axis.

My invention greatly simplifies piezoelectric quartz crystal controlled oscillation generation inasmuch as it eliminates the necessity of employing frequency doublers and frequency multipliers. This is a material advantage since losses in frequency doublers and multipliers are enormous when working with oscillations having frequencies higher than 30 megacycles, for example. My invention readily produces oscillations higher than 30 megacycles which are frequency stabilized, without requiring the use of any frequency doublers and multipliers. This is accomplished by using a crystal element adapted to vibrate strongly on harmonic frequencies. I prefer to employ a transverse or shear vibration, and in so doing greatly increase the strength of the vibrations corresponding to the odd harmonics. Vibrations other than the transverse or shear type may be employed.

By harmonics or harmonic frequencies I mean various frequencies called overtones which are approximately integral multiples of the fundamental frequency. Thus, odd harmonics would be approximately odd multiples of the fundamental frequency. By selecting odd harmonics such as the third, fifth, seventh, ninth, eleventh, and so on of, for example, a crystal that will oscillate on a fundamental frequency of 7.5 megacycles, vibrations of ultra-high frequencies such as 22.5 megacycles corresponding to the third harmonic, 37.5 megacycles corresponding to the fifth, 52.5 megacycles corresponding to the seventh harmonic, 67.5 megacycles corresponding to the ninth harmonic, and so on, may be obtained directly from the crystal oscillator.

In this manner the crystal vibrating on the harmonic can be used as the primary source of oscillations when employed in a conventional vacuum tube circuit, will not necessarily be simply a stabilizing device in a self-oscillatory circuit.

Another feature of this invention is that the crystals or piezoelectric body also may be operated on its harmonics when used as a resonator producing some reaction on an associated network, or it may be used in filter circuits, or as an absorption wavemeter on its harmonics for calibration purposes. This is accomplished by coupling the crystal plate to the electrical network, oscillator or receiver through an inductance or condenser so that absorption takes place on the harmonic frequencies of the crystal, and the electrical network, oscillator or receiver may be frequency calibrated as the frequency of the electric current fed to the electrical network or receiver or taken from the oscillator is varied through the range of the harmonics of the crystal plate and the power output of the electrical network, receiver or oscillator is measured or indicated. Sharp indications of electric power absorption are obtained at the harmonic frequencies of the crystal plate serving as frequency calibration points for the electrical network, receiver or oscillator.

Other features and advantages of this invention will be apparent from the following specification and the accompanying drawings in which, briefly, Figures 1a and 1b illustrate the manner in which the crystal of my invention is cut from the quartz hexahedron; Fig. 2 illustrates the orientation of the crystal with respect to the X, Y and Z axes; Fig. 3 is a circuit diagram illustrating the crystal connected to an oscillator tube; Figs. 4a and 4b illustrate a crystal element vibrating in the shear mode; Fig. 5 is an enlarged view of the crystal element showing the reduced peripheral dimensions greatly exaggerated; Fig. 6 is a sectional view through a piezoelectric crystal holder adapted for use with high and ultra-high frequency crystals; Fig. 7 is a sectional view taken along the line 7—7 of Fig. 6; Fig. 8 is a sectional view taken along the line 8—8 of Fig. 6; Fig. 9 is a sectional view taken along the line 9—9 of Fig. 6, and Fig. 10 is another circuit diagram showing the crystal connected to a vacuum tube.

Figure 1A:
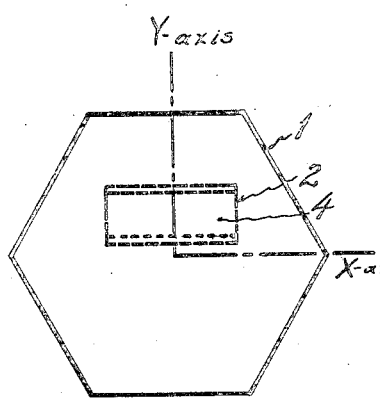
Figure 1B:
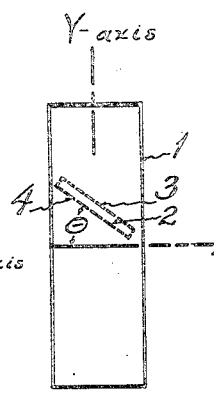

Referring to Figs. 1a and 1b of the drawing in detail, reference numeral 1 designates a section of a quartz hexahedron from which a plate or slab 2 adapted to be used as a piezo-electric crystal, is cut. The position of the plate 2 in the quartz hexahedronal crystal is shown in Fig. 1a, with respect to the $x$ or electric axis and the $y$ or mechanical axis. Fig. 1b shows the angle at which the crystal plate is cut with respect to the $z$ or optic axis. In Fig. 1a the quartz hexahedron is shown with the optic or $z$ axis at right angles to the $x$ and $y$ axes which are illustrated in the same plane. Fig. 1b, however, shows the $y$ and $z$ axes in the same plane and the $x$ axis at right angles to that plane. The plate 2 is cut from the crystal 1 in the manner shown, with the principal surfaces 3 and 4 of the plate, cut at an angle $\theta$ with respect to the optic or $z$ axis. The principal surfaces 3 and 4 are cut substantially parallel to the electric or $x$ axis.

Figure 2:
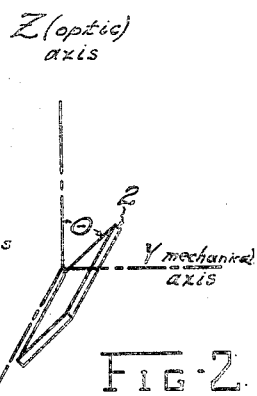

The orientation of the crystal plate 2 with respect to the crystallographic axes $x$, $y$ and $z$ is illustrated in Fig. 2, wherein the substantially parallel relation of the sides 3 and 4 to the $x$ axis, and the angle θ between these sides and the z axis, is shown.

The values of the angle θ may vary over rather wide limits and I have found that a piezoelectric plate suitable for use as a high and ultra-high frequency harmonic vibrator may be obtained when the plate is cut at an angle θ anywhere between plus 20 degress and plus 40 degrees; however plus 30 degrees is the optimum angle, although an angle of substantially plus 35 degrees may also be used producing a crystal plate having a low frequency-temperature co-efficient, the harmonic frequency changing not more than three cycles in a million per degree centigrade temperature change.

There are two kinds of quartz, namely, right-handed and left-handed. In the case of right-handed quartz, the convention is adopted that a positive angle is a clockwise rotation of the principal axis (optic axis) when the electrically positive face as determined by a squeeze, is up. For left-handed quartz, a positive angle is a counterclockwise rotation of the principal axis when the electrically positive face is up.

After the slab 2 is cut from the quartz crystal 1 it is ground so that its electrode faces 3 and 4 are given a high finish that approaches an optical finish. The aforesaid major or electrode faces are slightly convexed so that the peripheral portions of a crystal 0.7 inch wide and 0.9 inch long, adapted to oscillate on a third harmonic of around 15 megacycles, are about 75 millionths of an inch thinner than the central portions of the crystal plate. This convexing is shown greatly exaggerated in Fig. 5. In this figure it appears that the corners of the crystal plate are greatly reduced in thickness over the intermediate parts; this however is further exaggerated although it is of course obvious that the corners will be the thinnest part of a rectangular crystal plate.

In grinding these high and ultra-high frequency harmonic crystals I have found that a feature of utmost importance is to avoid forming even minute depressions in the surfaces of the major faces. If the electrode 6a is placed over any depressions formed in the crystal face, then it is extremely difficult to produce harmonic oscillations in the crystal. For this reason it is desirable, among other considerations, to make at least one of the electrodes, 6, 6a of a size considerably smaller than the corresponding crystal face. Where possible it is preferable to make both of these electrodes of reduced size, that is ¼ to ½ inch in diameter for the crystal dimensions previously given. Other considerations in employing electrodes of reduced size with harmonic piezoelectric oscillator plates are that the damping effect of the electrode is reduced and the crystal oscillates more freely. The electrostatic capacity is also reduced and the radio frequency voltage developed per unit crystal area is increased so that the current density in the crystal is increased. As a result harmonic oscillations start more readily in the crystal.

For connecting the piezoelectric plate to an electric circuit to produce electrical oscillations, a crystal holder, such as illustrated in Figs. 6, 7, 8 and 9, is employed. This holder is of the plug-in type having a casing 17 of insulation material designed for high and ultra-high frequencies. A pair of contact pins 19 and 20 are attached to the casing and a cover 6 is held on the casing by small bolts 18. This cover also functions as one of the crystal plate electrodes.

Figure 11:
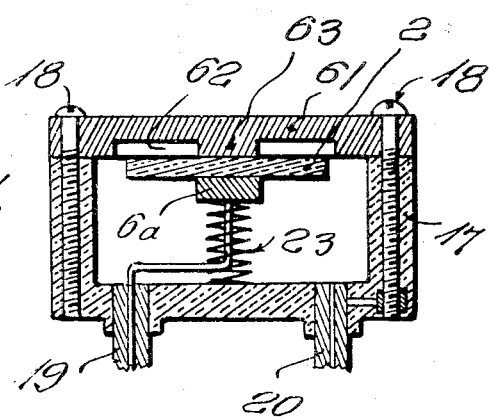
Fig. 11 shows in vertical section a modified form of the holder of Fig. 6 having two small button electrodes.

The cover 6 contacts the crystal plate 2 over the entire corresponding face of the crystal plate, however, where desired the bottom face of the cover 6 next to the crystal may be turned down as in a lathe so that a small button electrode is formed substantially in the center of the bottom surface of the cover corresponding to the button electrode 6a whereby only small areas of each of the crystal faces are in contact with the respective electrodes. Such an arrangement is shown in Fig. 11 in which the face of cover 61 is turned down to form the annular recess 62 leaving the central button 63, which constitutes the contacting area of the upper electrode for crystal 2. Centering retaining means such as ribs 25 shown in Figs. 6–9 may be provided.

In the arrangement of Figures 6, 7, 8, 9, and also in that of Fig. 11, the cover 6 is connected to the pin 20 through the bolt 18, the threaded member 22 embedded in the casing and the connector 21 which engages the member 22 and the pin 20. A piece of braided, flexible copper wire 24 is attached to the button 6a by soldering or otherwise and this is employed to connect this electrode to the pin 19. Both pins 19 and 20 are firmly embedded in the bottom of the casting 17 at one end to hold them in place and this may be accomplished during moulding of the casing. A coil spring 23 is provided to hold the button 6a against the crystal plate 2 and to provide a slight pressure against the aforesaid crystal plate. This coil spring is positioned substantially in the center of the cavity 2a, formed in the casing 17, between the adjacent ends of the ribs 25 extending into said cavity from the four corners thereof. These ribs are cut away slightly to form shoulders for receiving the button electrode 6a rather loosely therebetween and facilitate assembly of the piezoelectric crystal unit.

Figure 3:
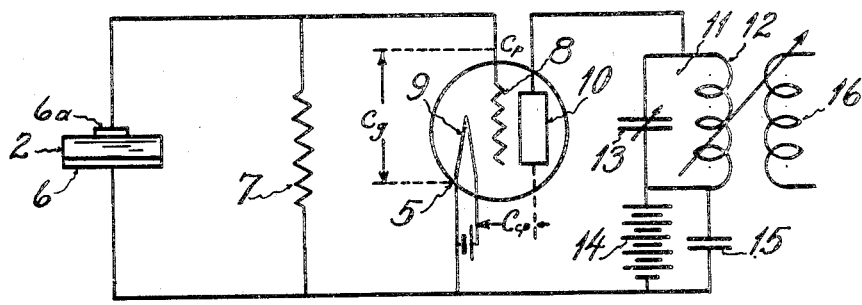
Figure 4A:
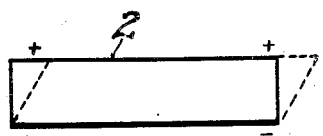
Figure 4B:
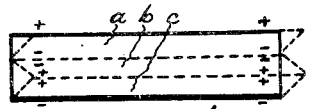

A form of circuit that may be employed to produce harmonic frequency oscillations of high or ultra-high frequencies from the piezoelectric crystal plate is illustrated in Fig. 3 wherein the three element vacuum tube 5 is connected with its grid electrode 8 to the crystal holder electrode 6a and the cathode 5 to the holder electrode 6. A grid leak resistor 7 is connected between the grid and the cathode. The anode 10 is connected to the oscillatory circuit 11 consisting of the inductance 12 and the variable condenser 13. A source of anode current supply 14 shunted by a high frequency by-pass condenser 15 is connected to the oscillatory circuit 11 and to the cathode 9.

The vacuum tube 5 may be of the multiple grid type and the connections thereto may be as schematically illustrated in Fig. 10. However, in the case of the three element tube it is very desirable to employ a vacuum tube having low internal capacities between the electrodes thereof and for this as well as other reasons type 955, 6E6, 6J5G and RK34 tubes are preferred. In the case of three element vacuum tubes of the type illustrated in Fig. 3 the capacity $C_g$ between the cathode and the grid should not exceed three or four micro-microfarads at the harmonic frequency on which the crystal is oscillating. The grid to anode capacity $C_p$ and the anode to cathode capacity $C_{cp}$ also should be correspondingly small. By keeping the interelectrode capacities in the tube down to low values, to reduce the by-passing action of these capacities for the high and ultra-high frequency electrical oscillations produced in the piezoelectric crystal plate, the load on the piezoelectric crystal plate is reduced for any particular grid electrode excitation derived from the crystal. This is an important consideration when high and ultra-high frequency electrical oscillations are produced in the crystal because the capacitative susceptance of even small capacities is by no means negligible at these frequencies and if a substantial capacity exists between the cathode and the grid a relatively large radio frequency current may flow through this capacity causing an additional load to be placed upon the crystal and thereby reducing the radio frequency potential of the crystal to a point that it is insufficient properly to drive the vacuum tube at the desired harmonic frequency of the crystal.

The oscillatory circuit 11 is adjusted substantially to the harmonic frequency of the crystal desired either by varying the inductance 12 or the capacity 13 until this circuit is resonant substantially to the harmonic frequency desired. In the case of the circuit shown in Fig. 3 the ratio of the capacity to the inductance in the circuit 11 should be high for proper operation of the crystal on a harmonic.

The circuit shown in Fig. 10 also may be used very conveniently with harmonic crystal oscillator plates of my invention. This circuit employs a radio frequency pentode tude 26, which may be an 802 or RK23 type, and the crystal 2 positioned between the electrodes 6a and 6, is connected to the grid electrode 8a and the indirectly heated cathode 9a. The cathode oscillatory circuit 11a consisting of the inductance 12a and condenser 13a is tuned substantially to one of the harmonics of the crystal plate 2 and this crystal plate is made to vibrate or oscillate at that harmonic frequency. A positive potential is applied from the source 33 through the connection 34 to the grid electrode 27 which functions more or less as an anode for the crystal oscillator tube circuit. The source 33 which may be a battery, generator, rectified alternating current or any other convenient current supply, is connected with its negative terminal to the oscillatory circuit 11a and through this to the cathode of the tube 26. A suitable grid leak 7a consisting of approximately 30,000 ohms and a radio frequency choke 7b of approximately 2.5 millihenries are connected between the grid 8a and the low potential end of the oscillatory circuit 11a. The oscillatory circuit 30 consisting of an inductance 31 and variable condenser 32 is connected between the positive terminal of the current source 33 and the anode 29 of the tube 26. This oscillatory circuit is also of a high capacity to inductance ratio and in this case the resonant frequency is adjusted to be substantially a multiple of the resonant frequency to which the circuit 11a is adjusted. The circuit 11a is adjusted substantially to an odd harmonic of the crystal 2 so that the crystal oscillates at this harmonic frequency and the circuit 30 is adjusted to a multiple of this harmonic frequency so that an output circuit coupled to the circuit 30 has impressed thereon electrical oscillations of this multipled frequency. This circuit is particularly valuable in ultra-high frequency circuits where it is desired to obtain piezoelectric crystal frequency control and stabilization.

Figure 12:
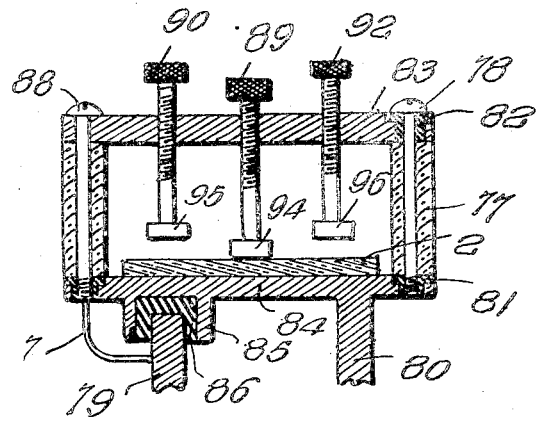
Fig. 12 shows in vertical section a further modified form of the holder of Fig. 6 provided with a plurality of small button electrodes any one of which may be selectively brought into electrical relation with the crystal.
Figure 13:
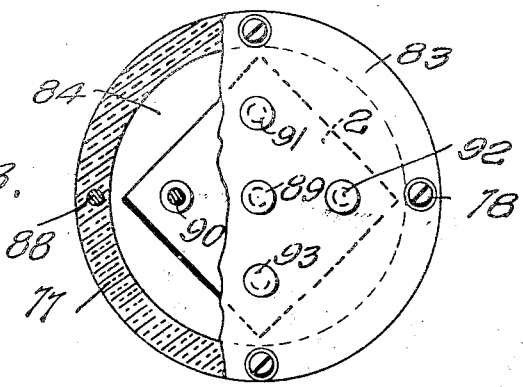
Fig. 13 shows in top plan view with parts broken away the modified holder of Fig. 12.

In order to facilitate initiating and maintaining the crystal plate 2 in oscillation on a harmonic frequency, such as, the third, fifth, seventh and so on, the electrode 6a, shown in Fig. 5, for example, may be moved over the face of the crystal plate until the plate oscillates vigorously at the desired harmonic frequency. It has been found that the plate oscillates best at a harmonic frequency when the electrode 6a is of relatively small diameter, between ¼ inch and ½ inch, and is located over a portion of the crystal face that is free from minute depressions. Means, such as, a manually operable screw device or a plurality of small button electrodes connected together and positioned side by side, any one or more of which may be raised from or lowered to the electrode face of the crystal plate by suitable screws, may be provided to the holder for use with harmonic crystal if desired. Such an arrangement is shown in Figs. 12 and 13 in which metal cover plate 83 closes the top of cylindrical insulating material casing 77 whose bottom is closed by metal plate 84 which constitutes the bottom electrode upon which crystal 2 rests. A plurality of screws, 89, 90, 91, 92, 93, pass through cover plate 83 and at their lower ends carry small button electrodes as 94, 95, 96. Mounting pin 80 makes connection with bottom plate 84. Mounting pin 79 is mounted on bottom plate 84 insulated therefrom by insulating plug 86, and is connected by wire 87 and bolt 88 to cover plate 83. Any desired one of the button electrodes carried by screws 89, 90, 91, 92, 93, may be selectively lowered into electrical relation with crystal 2, or may be withdrawn upwardly therefrom. Screw 78 is insulated from both cover plate 83 and bottom plate 84. Best results are obtained when both electrodes 6 and 6a are made of reduced size, as illustrated in the case of electrode 6a, with respect to the size of the corresponding crystal plate faces. However, satisfactory thickness mode harmonic operation is obtained when only one of the electrodes of reduced size is employed.

It will be observed that I have described various features of an embodiment of my invention in detail, however, I do not desire to limit my invention to the exact details set forth except insofar as those details may be defined by the claims.

What I claim is as follows:

1. Piezoelectric crystal apparatus adapted for operation on high ultra-high radio frequencies, comprising a piezoelectric crystal plate adapted to oscillate on odd harmonics of its fundamental frequency, said crystal plate having a pair of substantially parallel electrode faces, one of said electrode faces being slightly convex and both of said electrode faces having areas free from even minute depressions detrimental to harmonic oscillation, a holder for said crystal plate comprising a pair of substantially flat electrodes for said electrode faces, one of said electrodes for said slightly convex electrode face having an area of only a fraction of the area of said slightly convex electrode face, said electrode being positioned over an area of said face free from said depressions to facilitate harmonic operation.

2. Piezoelectric crystal apparatus as set forth in claim 1 further characterized in that said electrode faces of said piezoelectric crystal plate are disposed at an angle of substantially plus 30 degrees with respect to the optic axis and being substantially parallel to the X-axis.

3. Piezoelectric crystal apparatus as set forth in claim 1 further characterized in that said electrode faces of said piezoelectric crystal plate are cut at an angle between plus 20 degrees and plus 40 degrees to the optic axis and being substantially parallel to the X-axis.

4. Piezoelectric crystal apparatus as set forth in claim 1 further characterized in that said slightly convex electrode face of said piezoelectric crystal plate is convex approximately 75 millionths of an inch.

5. Piezoelectric crystal apparatus as set forth in claim 1 further characterized in that said electrode faces of said piezoelectric crystal plate are finished substantially to an optical finish and said slightly convex face is convex approximately 75 millionths of an inch.

6. A method of operating a crystal at an odd harmonic in a shear mode which comprises so cutting the crystal that its electrode faces are parallel to the X-axis and make an angle between +20 and +40 degrees with the Z-axis, convexing at least one of said faces to a slight extent to facilitate harmonic operation and applying an electric field of a frequency corresponding to the desired shear mode harmonic only to a small portion of the face area of said convex face.

7. A method of operating a crystal at an odd harmonic in a shear mode which comprises so cutting the crystal that its electrode faces are parallel to the X-axis and make an angle of substantially +30 degrees with the Z-axis, convexing at least one of said faces to a slight extent to facilitate harmonic operation and applying an electric field of a frequency corresponding to the desired shear mode harmonic only to a small portion of the face area of said convex face.

8. Piezoelectric crystal apparatus as set forth in claim 1 further characterized in that said electrode faces of said piezoelectric crystal plate are disposed at an angle of substantially +35 degrees with respect to the optic axis and substantially parallel to an electric axis, said crystal having on its harmonic frequency a frequency temperature coefficient of substantially less than three parts per million per degree centigrade.

9. Piezoelectric crystal apparatus, comprising: a housing of insulation material having an open cavity therein, a relatively small disc-like electrode positioned in said cavity, a spring substantially centrally positioned in said cavity between said electrode and the bottom of said cavity for supporting said electrode, a plurality of upright members projecting from the bottom of said cavity to confine said spring therebetween, shoulders formed on said upright members near the free ends thereof, the space between said shoulders being just big enough to receive said electrode lying flatwise thereon, a piezoelectric crystal element positioned in the open end of said cavity, said spring urging said electrode against the lower surface of said piezoelectric crystal element and tending to force said crystal out of said cavity through the opening, a second electrode and means for securing said second electrode over the opening of said cavity against the outer surface of said crystal element.

10. Piezoelectric crystal apparatus, comprising: a housing of insulation material having an open cavity therein, a piezoelectric crystal plate, a plurality of upright members extending into said cavity from the bottom thereof to define a central space in said cavity, a small flat electrode having an area substantially less than the area of a principal surface of said crystal plate, a coil spring confined in said central space, said coil spring engaging and pressing said electrode against a surface of said crystal plate, shoulders formed on said upright members for limiting the sidewise movement of said electrode, a second electrode and means for securing said second electrode over the opening of said cavity against the outer surface of said crystal plate.

11. Piezoelectric crystal apparatus, comprising: a housing of insulation material having an open cavity therein, a piezoelectric crystal and a relatively small disc-like electrode positioned in said cavity, said electrode having an area equal to a small fraction of the area of the major face of said piezoelectric crystal adjacent thereto, a plurality of web-like members projecting from the bottom of said cavity for positioning said small disc-like electrode substantially in the center of a major face of said piezoelectric crystal and substantially confining said electrode in said position, a second electrode engaging the other major face of said piezoelectric crystal and for closing the mouth of said cavity and means for urging said small disc-like electrode against said piezoelectric crystal and said piezoelectric crystal against said second electrode.

12. Piezoelectric crystal apparatus, comprising: a housing of insulation material having an open cavity therein, a piezoelectric crystal and a relatively small disc-like electrode positioned in said cavity, said electrode having an area equal to a small fraction of the area of the major face of said piezoelectric crystal adjacent thereto, a plurality of web-like members projecting from the bottom of said cavity for positioning said small disc-like electrode substantially in the center of a major face of said piezoelectric crystal and substantially confining said electrode in said position, a second electrode engaging the other major face of said piezoelectric crystal and for closing the mouth of said cavity, said second electrode having a small button portion of an area equal to a small fraction of the area of a major face of said crystal and being positioned on a side of said crystal opposite to said first mentioned electrode, and means for urging said small disc-like electrode against said piezoelectric crystal and said piezoelectric crystal against said second electrode.

13. Piezoelectric crystal apparatus, comprising: a housing of insulation material having an open cavity therein, a piezoelectric crystal and a relatively small disc-like electrode positioned in said cavity, said electrode having an area equal to a small fraction of the area of the major face of said piezoelectric crystal adjacent thereto, means for positioning said small disc-like electrode substantially in the center of a major face of said piezoelectric crystal and substantially confining said electrode in said position, a second electrode engaging the other major face of said piezoelectric crystal and for closing the mouth of said cavity and means for urging said small disc-like electrode against said piezoelectric crystal and said piezoelectric crystal against said second electrode.

14. Piezoelectric crystal apparatus, comprising: a housing of insulation material having an open cavity therein, a piezoelectric crystal and a relatively small disc-like electrode positioned in said cavity, said electrode having an area equal to a small fraction of the area of the major face of said piezoelectric crystal adjacent thereto, means for positioning said small disc-like electrode substantially in the center of a major face of said piezoelectric crystal and substantially confining said electrode in said position, and a second electrode engaging the other major face of said piezoelectric crystal, said second electrode having a small button portion of an area equal to a small fraction of the area of a major face of said piezoelectric crystal and being positioned on a side of said piezoelectric crystal opposite to said first mentioned electrode.

15. Piezoelectric crystal apparatus, comprising: a housing of insulation material having an open cavity therein, a piezoelectric crystal and a relatively small disc-like electrode positioned in said cavity, said electrode having an area equal to a small fraction of the area of the major face of said piezoelectric crystal adjacent thereto, means for positioning said small disc-like electrode substantially in the center of a major face of said piezoelectric crystal and substantially confining said electrode in said position, a second electrode engaging the other major face of said piezoelectric crystal and for closing the mouth of said cavity, said second electrode having a small button portion of an area equal to a small fraction of a major face of said crystal and being positioned on a side of said crystal opposite to said first mentioned electrode, and means for urging said small disc-like electrode against said piezoelectric crystal and said piezoelectric crystal against said second electrode.

16. A piezoelectric crystal arrangement which will function in the thickness mode of the crystal to give a single frequency response when subjected to high frequency comprising a piezoelectric crystal having a high ratio of dimensional difference between any lateral dimension and its thickness, two electrodes arranged each side of said crystal, the area of said electrodes being smaller than one-half the area of said crystal whereby multiple wave phenomena are eliminated.

17. A piezoelectric crystal arrangement which will function in the thickness mode of the crystal to give a single frequency response when subjected to high frequency comprising a piezoelectric crystal having a high ratio of dimensional difference between its least lateral dimension and its thickness, two electrodes arranged each side of said crystal, the area of said electrodes being smaller than one-half the area of said crystal whereby multiple wave phenomena are eliminated.

18. A piezo-electric crystal arrangement which will function in the thickness mode of the crystal to give a single frequency response when subjected to high frequency, comprising a piezoelectric crystal having a high ratio of dimensional difference between the shortest element of a major face of said crystal passing through the center of said major face, and the thickness of said crystal, and two electrodes, one arranged on each side of said crystal, in electrical relation with major faces thereof respectively, the area of each of said electrodes being smaller than one-half the area of each of said major faces respectively of said crystal, whereby multiple wave phenomena are eliminated and harmonic operation is facilitated.

19. A piezo-electric crystal arrangement which will function in the thickness mode of the crystal to give a single frequency response when subjected to high frequency, comprising a substantially rectangular piezo-electric crystal having a high ratio of dimensional difference between the shortest element of a major face of said crystal passing through the center of said major face, and the thickness of said crystal, and two substantially circular electrodes, one arranged on each side of said crystal, in electrical relation with major faces thereof respectively, the area of each of said electrodes being smaller than one-half the area of each of said major faces respectively, whereby multiple wave phenomena are eliminated and harmonic operation is facilitated.

20. A piezo-electric crystal arrangement which will function in the thickness mode of the crystal to give a single frequency response when subjected to high frequency, comprising a substantially rectangular piezo-electric crystal having a high ratio of dimensional difference between the shortest element of a major face of said crystal passing through the center of said major face, and the thickness of said crystal, and two substantially circular electrodes, one arranged on each side of said crystal, in electrical relation with major faces thereof respectively, the diameter of said electrodes being not greater than one-half the minimum transverse element of the corresponding major face passing through the center of said major face, whereby multiple wave phenomena are eliminated and harmonic operation is facilitated.

21. In combination, a piezo-electric crystal adapted to operate in the thickness mode at a frequency which is substantially a harmonic of its fundamental frequency, said crystal having a high ratio between its shortest facial dimension through the center of the major faces of said crystal and the crystal thickness, a pair of electrodes positioned in opposing relation, one on each side of said crystal in contact with the central area of the major face of said crystal, said area being active to excite said crystal and being a portion less than one-half of the total area of said major face, and connections to said electrodes for applying oscillations of said harmonic frequency between said electrodes to excite said crystal at said harmonic frequency.

22. In combination, a piezoelectric crystal adapted to operate in the thickness mode at a frequency which is substantially a harmonic of its fundamental frequency, said crystal having a high ratio between its shortest facial dimension through the center of the major faces of said crystal and the crystal thickness, a pair of electrodes positioned in opposing relation, one on each side of said crystal in contact with the central area of the major face of said crystal, said central area being active to excite said crystal, each electrode being substantially surrounded by uncovered area of the respective major face, said uncovered area of said major face being free in space and greater than the area of said electrodes thereby materially reducing capacity between said electrodes at the frequency of said harmonic, and connections to said electrodes for applying oscillations of said harmonic frequency between said electrodes for excitation of said crystal.

23. In combination, a piezoelectric crystal adapted to operate in the thickness mode at a frequency which is substantially a harmonic of its fundamental frequency, said crystal having a high ratio between its shortest facial dimension through the center of the major faces of said crystal and the crystal thickness, a pair of electrodes positioned in opposing relation, one on each side of said crystal cooperating with the central area of the major face of said crystal, said central area being active to excite said crystal, at least one of said electrodes being small relative to the area of the corresponding major face of said crystal and in contact with said major face and being substantially surrounded by uncovered area of the respective major face of said crystal greater than the area of said small electrode, whereby capacity between said electrodes is reduced, and connections between said electrodes for applying oscillations of said harmonic frequency between said electrodes for excitation of said crystal.

24. In a piezoelectric crystal holder, a flat piezoelectric crystal, a housing comprising an electrically conducting plate of area at least as great as a major face of said crystal, said plate being on a first side of said housing, said crystal being positioned with a first major face thereof engaging said plate, a button electrode of area not exceeding one-half the area of a major face of said crystal positioned on the side of said crystal opposite said plate, a spring positioned between said button electrode and a second side of said housing opposite said first side thereof and urging said button electrode against the second major face of said crystal, and means comprised in said housing for retaining said button electrode and said spring in substantially fixed relation to said housing.

25. A holder as recited in claim 24, said crystal being mounted substantially centrally in said housing, and said retaining means holding said button electrode and said spring substantially centrally in said housing.

26. In a piezoelectric crystal holder, a flat piezoelectric crystal, a support comprising an electrically conducting plate of area at least as great as a major face of said crystal, said plate having a raised electrically conducting button portion thereof formed on one side thereof and of area substantially less than the full area of said plate, said crystal being positioned with a first major face thereof engaging said raised button portion, a button electrode positioned on the second major face of said crystal opposite said plate, said raised button portion and said button electrode being respectively substantially less in area than the area of a major face of said crystal, and holding means for holding said button electrode adjacent said major face of said crystal.

27. In a piezoelectric crystal holder, a flat piezoelectric crystal, a support comprising an electrically conducting plate, said crystal being positioned with a first major face thereof engaging said plate, a plurality of small button electrodes each of area relatively small with respect to the area of a major face of said crystal, and mounting means carried by said support and comprising selective control means for selectively positioning any desired one of said button electrodes against the second major face of said crystal opposite the first major face thereof so engaging said plate.

28. In a piezoelectric crystal holder, a flat piezoelectric crystal, a housing comprising an electrically conducting plate, said plate being on a first side of said housing, said crystal being positioned with a first major face thereof engaging said plate, a button electrode of area not exceeding one-half the area of a major face of said crystal positioned on the side of said crystal opposite said plate, a spring positioned between said button electrode and a second side of said housing opposite said first side thereof and urging said button electrode against the second major face of said crystal, and means comprised in said housing for retaining said button electrode and said spring in substantially fixed relation to said housing.

JOHN M. WOLFSKILL.

REFERENCES CITED

The following references are of record in the file of this patent:

UNITED STATES PATENTS

| Number | Name | Date |
| --- | --- | --- |
| 2,017,897 | Emerslaben | Oct. 22, 1935 |
| 2,119,848 | Hawk | June 7, 1938 |
| 2,128,837 | Meahl | Aug. 30, 1938 |
| 2,151,754 | Fair | Mar. 28, 1939 |
| 2,159,796 | Hawk | May 23, 1939 |
| 2,173,589 | Mason | Sept. 19, 1939 |
| 2,178,224 | Diehl | Oct. 31, 1939 |
| 2,218,200 | Lack et al. | Oct. 15, 1940 |
| 2,249,933 | Bechmann | July 22, 1941 |
| 2,343,059 | Hight | Feb. 29, 1944 |

FOREIGN PATENTS

| Number | Country | Date |
| --- | --- | --- |
| 279 595 | Great Britain | Nov. 3, 1927 |
| 457,342 | Great Britain | Nov. 26, 1936 |

OTHER REFERENCES

Proceedings of the Institute of Radio Engineers, vol. 14, Nov. 4, August 1926, page 451.